US008477911B2

(12) United States Patent
Darling

(10) Patent No.: US 8,477,911 B2
(45) Date of Patent: Jul. 2, 2013

(54) PERSONAL EMERGENCY RESPONSE SYSTEM WITH ALTERNATIVE VOICE LINE CAPABILITY

(75) Inventor: Richard Darling, Vista, CA (US)

(73) Assignee: Instant Care, Inc., Vista, CA (US)

( * ) Notice: Subject to any disclaimer, the term of this patent is extended or adjusted under 35 U.S.C. 154(b) by 505 days.

(21) Appl. No.: 12/701,393

(22) Filed: Feb. 5, 2010

(65) Prior Publication Data
US 2011/0195686 A1   Aug. 11, 2011

(51) Int. Cl.
*H04M 11/04*   (2006.01)

(52) U.S. Cl.
USPC .................................. 379/45; 379/38; 379/40

(58) Field of Classification Search
USPC .................. 379/45, 155; 455/404.1; 600/300; 340/539.19
See application file for complete search history.

(56) References Cited

U.S. PATENT DOCUMENTS

| | | | |
|---|---|---|---|
| 3,914,692 A | 10/1975 | Seaborn, Jr. | |
| 5,305,370 A | 4/1994 | Kearns et al. | |
| 5,515,419 A | 5/1996 | Sheffer | |
| 6,093,146 A * | 7/2000 | Filangeri | 600/300 |
| 6,518,889 B2 | 2/2003 | Schlager et al. | |
| 7,315,736 B2 * | 1/2008 | Jenkins | 455/404.1 |
| 7,382,243 B1 | 6/2008 | Shepher | |
| 7,397,907 B2 * | 7/2008 | Petite | 379/155 |
| 2004/0246128 A1 * | 12/2004 | Menard | 340/539.19 |
| 2007/0082651 A1 | 4/2007 | Loizeaux | |
| 2008/0085696 A1 | 4/2008 | Salahshour et al. | |

FOREIGN PATENT DOCUMENTS
EP   0 208 080 A1   1/1987

OTHER PUBLICATIONS

Beard, et al., A Discrete Fourier Transform Based Digital DTMF, Fall 1995, Dept. of Electrical & Computer Engineering, Mississippi State Univ.

* cited by examiner

*Primary Examiner* — Simon Sing
*Assistant Examiner* — Van D Huynh
(74) *Attorney, Agent, or Firm* — Michael D. Eisenberg

(57) ABSTRACT

A communication system comprises a transmitter, a console in operative communication with the transmitter, an audible communication device and a tone simulator. The transmitter is in operative communication with the console and operative to send a first signal to the console. The console is operatively connected to a communication network and is operative to send a second signal over the communication network to at least two response systems. The console comprises a receiver operative to receive the first signal from the transmitter, a controller operative to compare the first signal from the transmitter with a set of pre-determined values, access a communication network and dial one of the at least two pre-programmed voice line addresses, and a communication interface operative to connect the receiver to a communication network. The audible communication device is coupled to the controller and the communication interface. Each pre-programmed voice line address corresponds to one of the two different response systems. The tone simulator generates a first tone upon connection of a voice line communication to one of the two different response systems and a second tone upon termination of audible communication on the voice line between a user of the communication system and an individual at one of the two different response systems. The first tone signals to the console that the voice line communication has begun, and the second tone signals to the console that the voice line communication has ended.

20 Claims, 8 Drawing Sheets

PERSONAL EMERGENCY RESPONSE SYSTEM WITH ALTERNATIVE VOICE LINE CAPABILITY

FIELD OF THE INVENTION

The present invention is generally directed to communication systems and methods.

BACKGROUND OF THE INVENTION

Various personal emergency response systems ("PERS") have been developed out of the necessity to summon help during emergency situations. Typically, such systems allow a person experiencing an emergency to simply press a button to get help. When the emergency button is pressed, a console uses a standard telephone line to dial an emergency response center. The operator at the emergency response center answers the incoming call and communicates through the console via two way voice communications. The operator then communicates to local emergency services, and help is summoned to the location of the emergency.

However, PERS have many limitations. For instance, a PERS does not provide the ability to communicate with a medical professional in non-emergency situations. For most non-urgent medical needs, a patient still has to visit a doctor's office. For many elderly people—those most likely to use a PERS—such visits to a doctor's office are inconvenient. Elderly people often are unable to transport themselves so transportation must be arranged. Medical offices can be crowded and can expose vulnerable patients to a variety of contagious illnesses. Still further, elderly persons often have difficulty in determining, remembering, and/or dialing phone numbers. This can make calling a doctor's office difficult. U.S. Pat. No. 5,305,370, U.S. Patent Application Publication Nos. 2007/0082651 and 2008/008596 and European Patent Application No. 0 208 080, which are each incorporated by reference herein in their entirety, all suffer from this disadvantage.

Although some response systems may be used for both emergency and non-emergency situations, they are not compatible with existing PERS console-based systems. Typical PERS require a particular dual-tone multi-frequency ("DTMF") signal to start a phone call. This usually is a tone corresponding to pressing the number "1" on a push button telephone. Similarly, to completely terminate an emergency call, the PERS usually requires a tone corresponding to pressing the number "9" on a push button telephone. This DTMF signaling is known as a digital "handshake and disconnect." Systems that have been developed for both emergency and non-emergency communications lack this mechanism to maintain and terminate telephone calls and therefore typically are not compatible with common PERS systems.

For instance, U.S. Application Pub. No. 2004/0246128 to Menard ("128 application"), which is incorporated by reference herein in its entirety, describes a health and wellness communications system that can be used for emergency and non-emergency situations. The Menard system uses two-way communication devices and a bi-directional wireless communication network. The system includes a personal medical device with a user interface and network. The personal medical device may interact directly with a communications network or may interact with a personal wireless device, which in turn interacts with the network. In either case, the personal medical device may generate signals that are received by a central monitoring station. Alternatively, the personal medical device may communicate with a building control or a security system. The system of the '128 application suffers from the drawback that it is not readily compatible with existing PERS systems that communicate over standard telephone lines because it lacks digital "handshake and disconnect" signals.

In view of the above, there exists a need for an emergency response system that can be used for both emergency and non-emergency medical communication. There further exists a need for a system that provides this dual capability and is compatible with and works in concert with contracted, pre-programmed emergency response and medical triage nurse-line call centers. In particular, there is a need for a communication system that can be used for both emergency and non-emergency medical communications that provides digital "handshake and disconnect" signals in the form of tones recognizable to PERS systems.

SUMMARY OF THE INVENTION

In view of the foregoing, it is an object of the present invention to provide a communication system that can be used for both emergency and non-emergency medical communications.

It is another object of the invention to provide a communication system that is compatible with most existing PERS.

In particular, it is another object of the invention to provide a communication system that generates the recognizable tones necessary for a digital "handshake and disconnect" to maintain and terminate telephone calls to emergency and non-emergency medical facilities and personnel.

These objects are achieved by a communication system that comprises a transmitter that communicates to a fixed console connected to a communication network and a tone simulator. The transmitter is in operative communication with the console and is operative to send a first signal to the console. The console is operatively connected to a communication network and is operative to send a second signal over the communication network to at least two different response systems. The console comprises a receiver operative to receive the first signal from the transmitter, a controller operative to compare the first signal from the transmitter with a set of pre-determined values, and a communication interface. Preferably, the pre-determined set of values comprises one or both of: a frequency value and a time value. The controller operates to compare the first signal from the transmitter with a set of pre-determined values and access a communication network and dial one of the at least two pre-programmed voice line addresses. Each pre-programmed telephone number corresponds to one of the two different response systems. The two different response systems may comprise an emergency response system and a non-emergency medical center, and the non-emergency medical center may be a medical triage call center.

The console further comprises a communication interface operative to connect the receiver to a communication network. An audible communication device is coupled to the controller and the communication interface. The system also includes a tone simulator. A first tone is generated upon connection of a voice line communication to one of two different response systems and a second tone being generated upon termination of audible communication on the voice line between a user of the communication system and an individual at one of the two different response systems. The first tone signals to the console that the voice line communication has begun, and the second tone signals to the console that the voice line communication has ended. Preferably, the first tone is a sinusoidal tone representing a 1 tone, and the second tone is a sinusoidal tone representing a 9 tone.

The transmitter may comprise one or more buttons, and each button operates to send a signal to the console when pressed. In a preferred embodiment, the transmitter comprises two buttons. The first button operates to send a signal to the console to dial a first pre-programmed voice line address to call an emergency response system when pressed. The second button operates to send a signal to the console to dial a second pre-programmed voice line address to call a non-emergency medical center.

Some embodiments may be used to sense vital signs of a user or other signals of hazardous activity such as smoke or carbon monoxide. Such embodiments further comprise one or more sensors operative to send a signal to the console, the sensors comprising one or more of: an ambient temperature sensor, a body temperature sensor, a pulse sensor, a motion sensor, a carbon monoxide sensor and a smoke sensor.

These and other features and advantages of the present invention will be appreciated from review of the following detailed description of the invention, along with the accompanying figures in which like reference numerals refer to like parts throughout.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
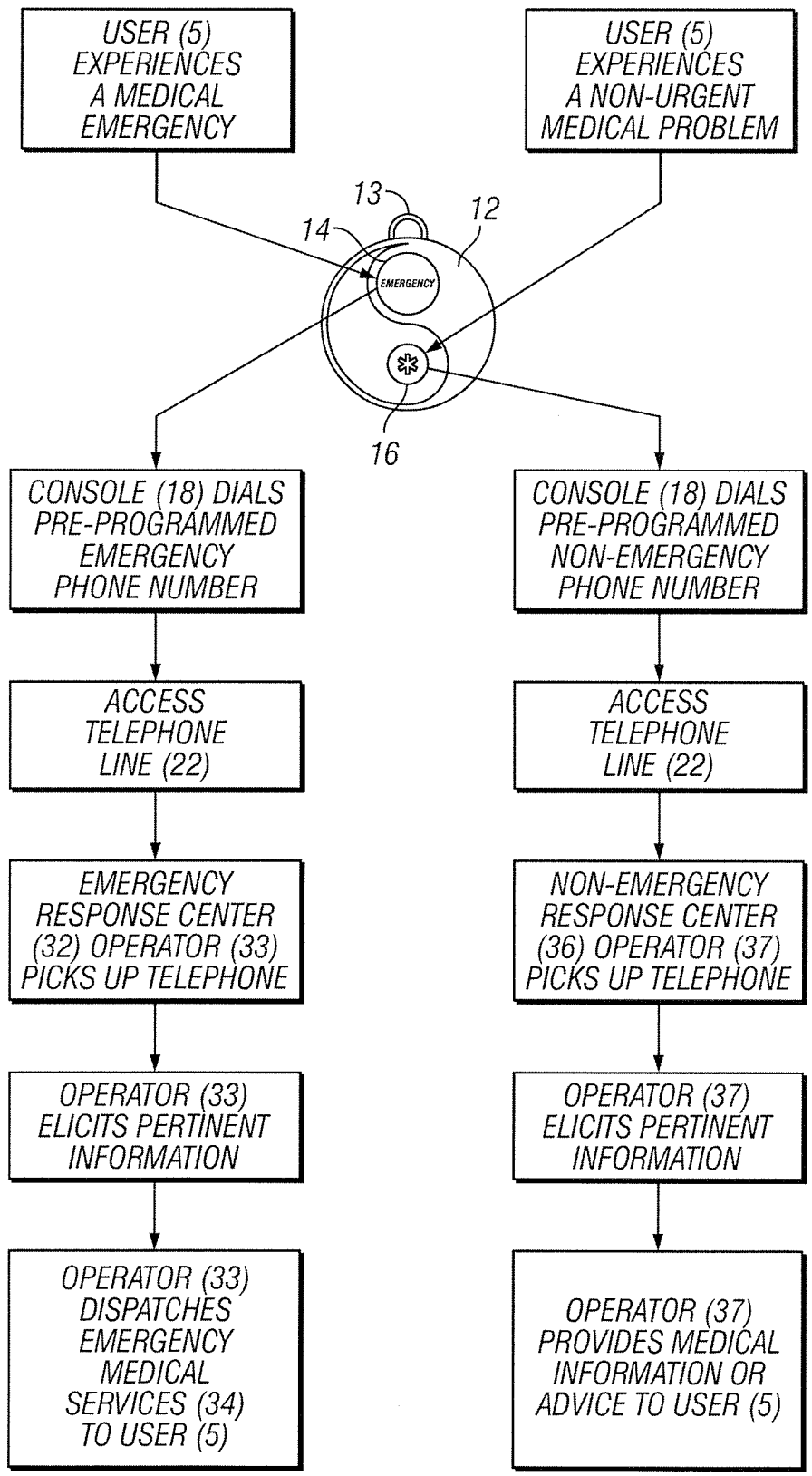
FIG. 1 is a flow diagram showing an embodiment of a communication system in accordance with the present invention.
Figure 2:
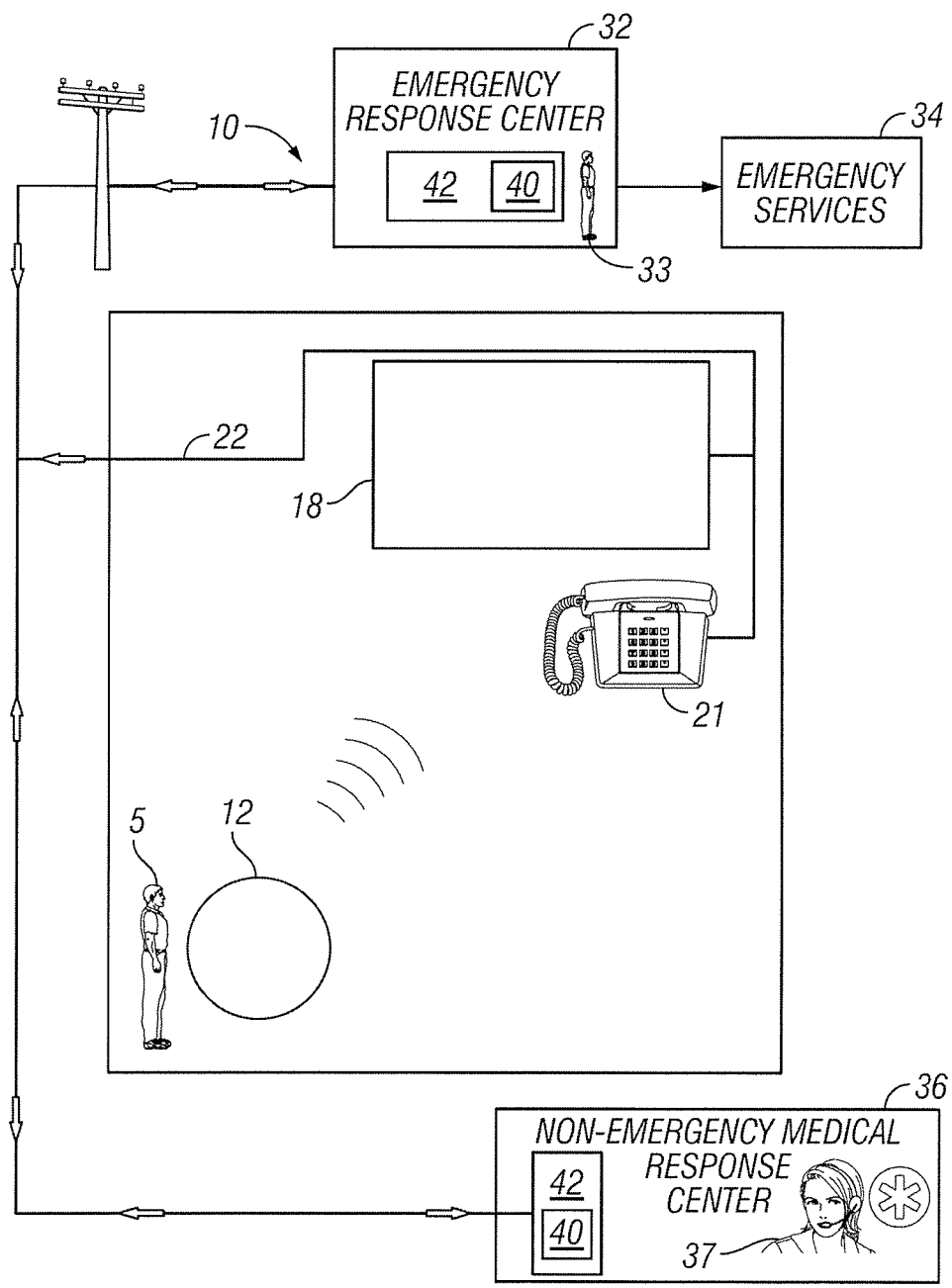
FIG. 2 is a detailed flow diagram showing an embodiment of a communication system in accordance with the present invention.
Figure 3:
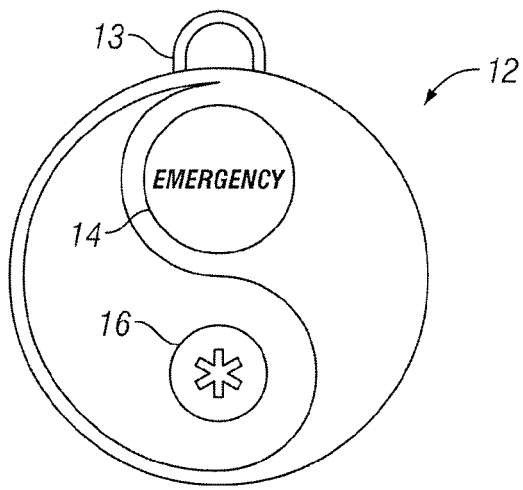
FIG. 3 is a perspective view of an embodiment of a transmitter in accordance with the present invention.
Figure 4:
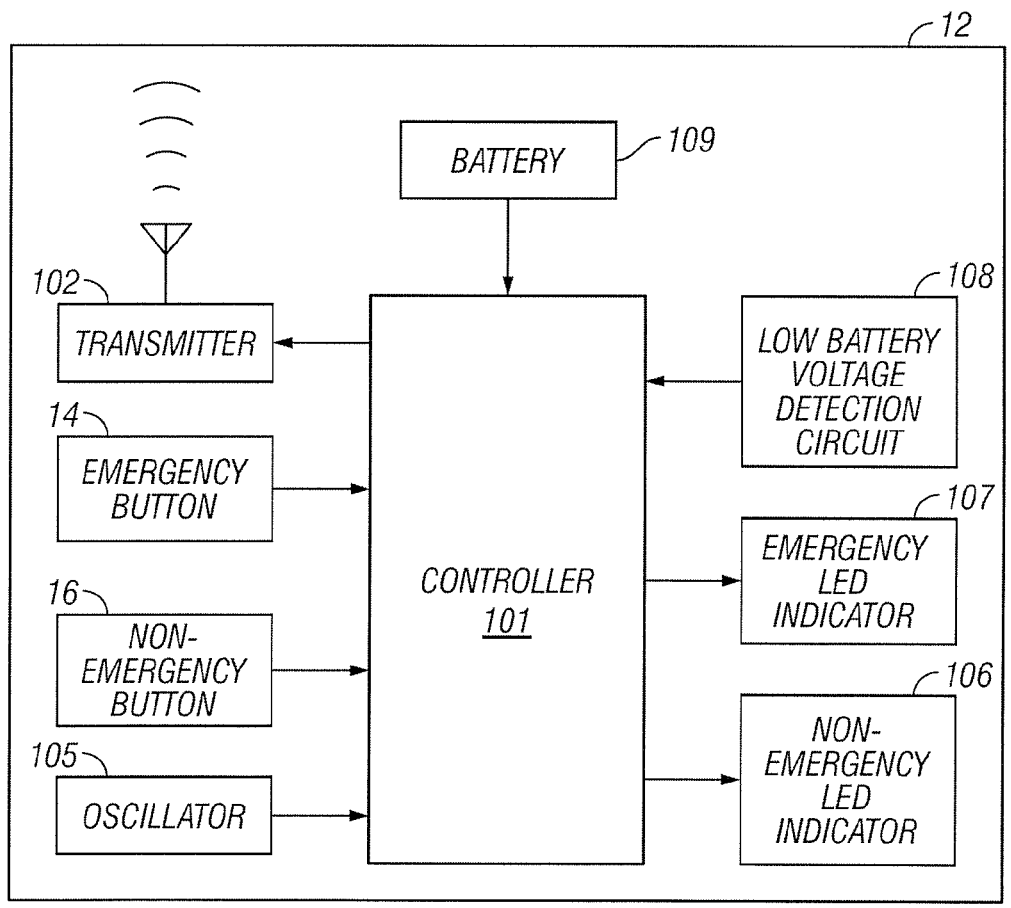
FIG. 4 is a block diagram of the transmitter shown in FIG. 2.

Referring first to FIGS. 1-6, exemplary embodiments of a communication system will be described. The communication system 10 may comprise a transmitter 12, which may be a portable handheld device or a wearable device. Preferably, transmitter 12, shown in detail in FIGS. 3 and 4, is a wireless signal transmitter having at least two buttons 14, 16. Transmitter 12 can be activated by the user 5 either for emergency needs or non-emergency medical assessments. As discussed in more detail herein, one of the buttons 14 is for emergency situations and the other 16 is for non-urgent medical needs.

Transmitter 12 may comprise a microcontroller 101, a radio frequency transmitter 102, an oscillator 105, a low battery voltage detect circuit 108 and a battery 109. A non-emergency visual activation LED indicator 106, preferably a blue light, and an emergency visual activation LED indicator 107, preferably a red light, are on or close to the surface of the transmitter 12 so the user 5 can see when each is activated.

Figure 5:
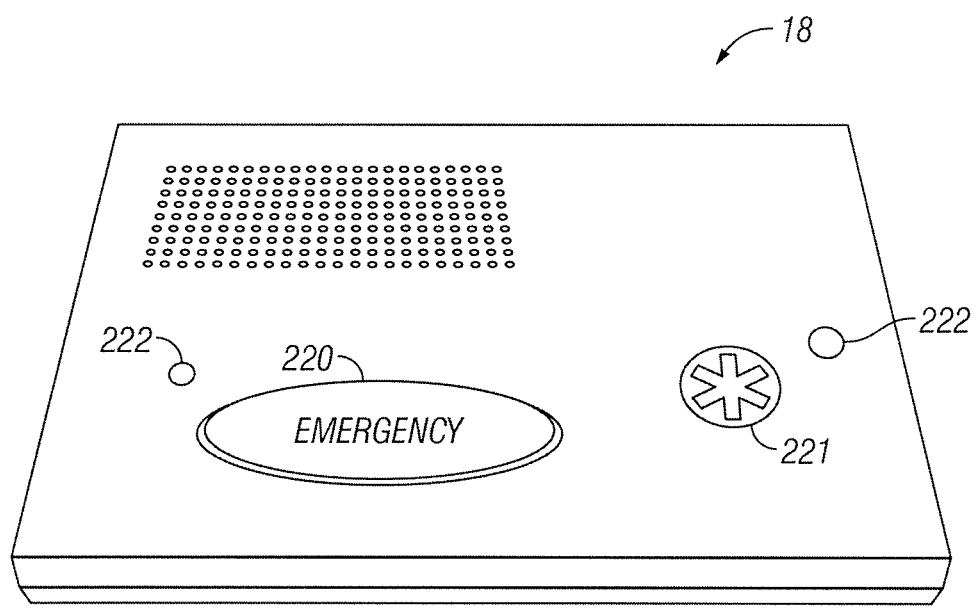
FIG. 5 is a perspective view of an embodiment of a console in accordance with the present invention.
Figure 6:
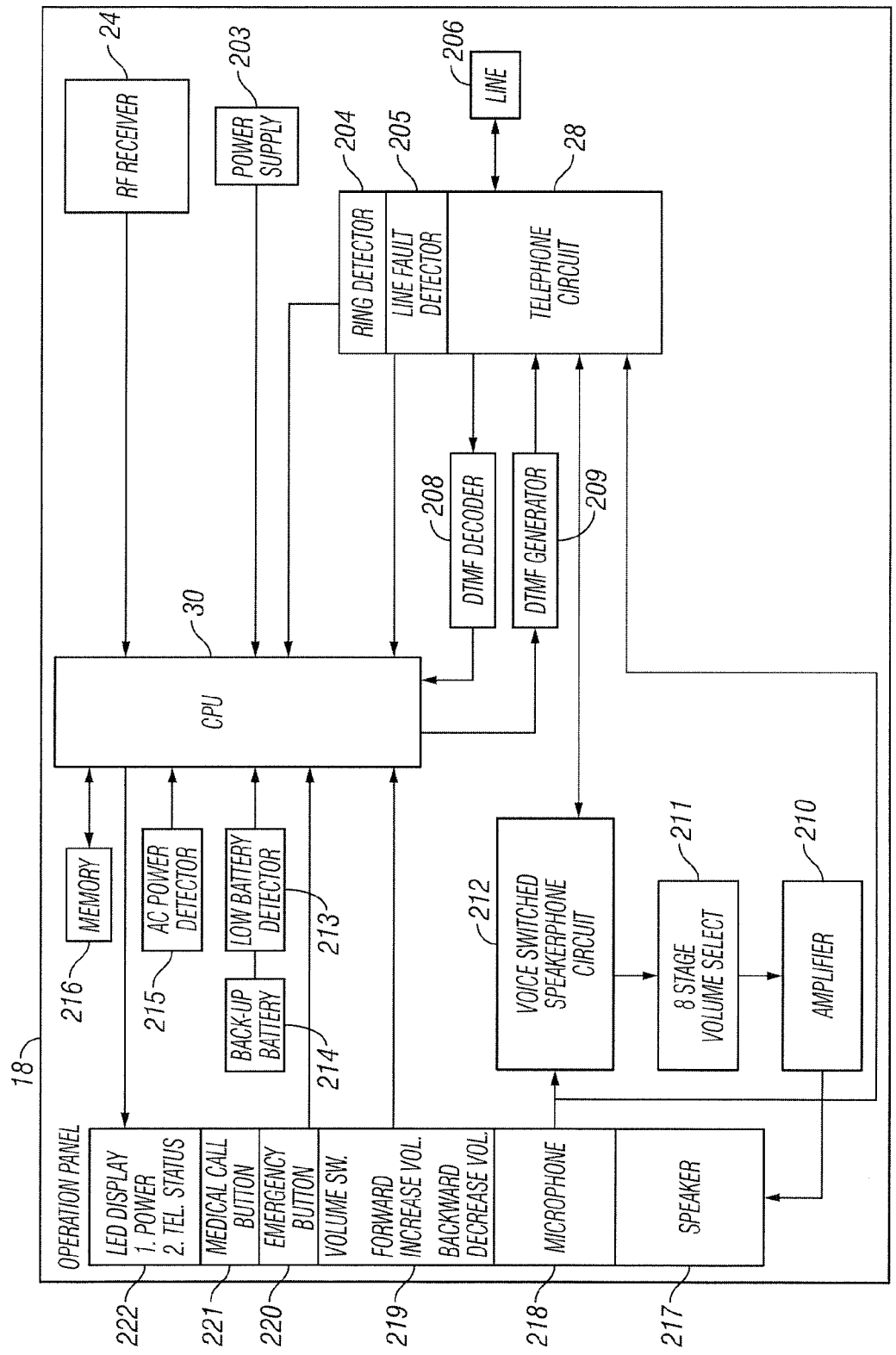
FIG. 6 is a block diagram of the console shown in FIG. 2.

The communication system 10 further comprises a base station or console 18 in operative communication with the transmitter 12 and interfaced with a communication network 22 via communication interface 28 and, preferably, telephone 21. The communication network may be a standard telephone network, a wireless telephone network, a global system for mobile communications (GSM) network, voice over internet protocol (VoIP) or any other communication network that enables audible, voice line communication between individuals at different locations. As shown in FIGS. 5 and 6, a preferred console 18 comprises a receiver 24 to receive a signal from the transmitter 12, a microprocessor or controller 30 to evaluate the received signal, access the communication network 22 and dial voice line address, a tone generator 209 to send account information to a call center, and a communication interface 28 to connect the receiver 24 to the communication network 22.

As best seen in FIG. 6, base station or console 18 may further comprise a power supply 203, a ring detector 204, a line fault detector 205, a telephone line input jack 206, a DTMF decoder 208, an amplifier 210, a volume select 211, a speakerphone circuit 212, a low battery detector 213, a back up battery 214, an AC power detector 215, a memory chip 216, a speaker 217, a microphone 218, a volume switch 219, emergency button 220, medical call button 221, and/or an LED display 222. Speaker 217 and/or microphone 218, or other audible communication device is operatively coupled to the controller 30 and the telephone interface 28. It should be understood that any audible communications device could be used so long as it enables bidirectional speech between the user and an individual being called through a telephone line. Console 18 requires power supply 203 or a charged back up battery 213 to operate. In addition, the telephone line input jack 206 must be connected. Memory chip 216 is pre-programmed to contain the appropriate operation data, such as the telephone numbers to call in emergency and non-emergency situations.

Communication system 10 can include any computing devices, such as computers (PCs, laptops, notebooks, etc.), telephone handsets, cellular phones, personal digital assistants (PDAs) and so on. A typical communication system includes a central processing unit (CPU), or microprocessor, here referred to as controller 30. The CPU is optionally connected through a bus to a communications network interface. The communications network interface serves to connect console 18 to a communications network. The communications network could be any system that facilitates remote communication between more than one individual at different locations. It could include a standard telephone network, a wireless telephone network, voice over internet protocol (VoIP), or any other telecommunications system. A wireless telephone interface could comprise GSM, GPRS, CDMA or other wireless protocols.

In preferred embodiments, the communications network interface is a telephone interface that communicates with a standard telephone network or a wireless telephone network. A network may comprise any connection of two or more computers that enables them to communicate and would include the requisite transmission devices, servers, cables, routers and satellites. A telephone network comprises the complete infrastructure necessary for transmitting telephone communications. One standard portion of a telephone network is the telephony server, which typically comprises a computer system that provides telephone integration. The term "telephony server" may refer to the entire computer system that provides the integration or to just the plug-in boards and software.

Controller 30 is configured to access a communication network 22, and preferably a telephone network. In particular, controller 30 is programmed to dial or route to at least two voice line addresses, each of which calls a different response system. A voice line address may be any unique sequence of numbers or data that is specific to an individual or location and allows voice communication with that individual or location, such as a standard or wireless telephone number or an interne protocol (IP) address. For non-telephone networks, the controller 30 routes data packets to pre-programmed addresses. In preferred embodiments, the voice line address is a telephone number for a standard or wireless telephone. One of those is an emergency response system 32 such as a call center that receives emergency distress calls. Such a call center, exemplified by the "911" emergency system, does intake of pertinent information and communicates with and directs emergency services 34 such as ambulances, emergency medical technicians and other medical emergency responders to the site of the emergency. Additional response systems preferably include a non-emergency medical response system 36 such as an urgent care facility or a medical call center wherein triage nurses answer the telephones, do intake of pertinent information, and provide medical advice to alleviate the health problem of the caller. It should be noted that controller 30 could be pre-programmed to dial any telephone number such as the number of a family member, close friend, or neighbor of the user.

Communication system 10 provides a tone simulator 40 for generating at least two tones that together comprise a "digital handshake and disconnect" process. As discussed in detail below, this tone simulation functionality can be provided by hardware or software situated on various components at various locations in the communication system but preferably is software located on the telephony server 42 of either emergency response system 32 or non-emergency medical response system 36. In particular, upon connection of a phone call through console 18 to a response system 32 or 36 the tone simulator 40 emits a first audible sinusoidal tone. This first tone preferably simulates a "1" tone, i.e., the tone emitted when the "1" button of a telephone is pressed. The tone simulator 40 generates this tone by producing two tones simultaneously having different frequencies, specifically 697 hertz (Hz) and 1209 Hz. The "1" tone acts as a "digital handshake" to signal to console that the phone call has been answered by the response system. Upon the disconnection, or termination, of the telephone call to the response system, the tone simulator 40 emits a second audible sinusoidal tone. The second tone simulates a "9" tone, i.e., the tone emitted when the "9" button of a telephone is pressed, and acts as a "digital disconnect" to signal to console 18 that the phone call has been terminated. The "9" tone is generated by production of two tones simultaneously having different frequencies, namely, 852 Hz and 1477 Hz.

A preferred first tone, or "1" tone, to signal a "digital handshake" corresponds to the following definitions of the first and second simultaneously generated tones: first "1" tone frequency is 697 Hertz; second "1" tone frequency is 1209 Hertz. The amplitude and duration of the first and second "1" tones may vary, but preferred parameters are −40 dB and 0.5 seconds. A preferred second tone, or "9" tone, to signal a "digital disconnect" corresponds to the following definitions of the first and second simultaneously generated tones: first "9" tone frequency 852 Hertz; second "9" tone frequency is 1477 Hertz. The amplitude and duration of the first and second "9" tones may vary, but preferred parameters are −40 dB and 0.5 seconds. Console 18 is equipped with DTMF tone recognition so it can recognize the simulated "1" and "9" tones and accept the "digital handshake and disconnect" signals. The tone simulation and recognition provides the important advantage of allowing communication system 10 to be integrated and fully functional with most existing PERS systems because the above-described generated tones simulate the DTMF tones generated by call center operators in existing PERS systems.

In preferred embodiments, the tone simulator 40 is software located on the telephony server 42 of the call center telephone system 32 or 36. In particular, the software may lie on the digital receiver of the call center telephone system, and may be encoded onto a chip on the digital board where the system's operating software lies. It should be understood that the tone simulator 40 can be any form of software, whether an operating system or application. Although the tone simulator 40 is discussed herein primarily as a software component running on the telephony server 42 of the emergency response system 32 and non-emergency medical response system 36, it should be understood that a tone simulator consistent with the present invention can include hardware components under software control, or alternatively may be run over a number of computers, with software components of the tone simulator residing in one or more computers. Such hardware could run on a processor or could reside in a module on the digital receiver board of the call center telephony server. Also, original equipment could be built that would interface with the digital receiver.

Alternatively, tone simulator hardware or software could be operated entirely on the user side of the communication system so the tone simulation functionality is not dependent upon installation of components on the call center side. For example, the tone simulator could be a software component running on the user's home telephone system or personal computer. Alternatively, embodiments of console 18 or transmitter 12 may comprise tone simulator software, or the simulated tones could be generated manually by the user.

In operation, the user 5 either wears transmitter 12 around his or her neck or keeps it on his or her person by other means, such as keeping it in a clothing pocket or personal carrying case such as a purse, briefcase, pouch or fanny pack. The transmitter 12 can be attached to a string, wire or necklace by ring 13. First, an emergency scenario will be described. In the event that the user 5 experiences a medical emergency, the user 5 initiates the communication process by pressing emergency button on transmitter 12. This activates emergency visual activation LED 107, which emits a red light to indicate activation. Microcontroller 101 of transmitter 12 transmits an emergency signal to console 18, which tells console 18 to dial the pre-programmed emergency telephone number. Preferably the signal is an encoded RF transmission and travels via radio frequency transmitter 102. The signal may be sent over a radio frequency (RF) or power line carrier, or any other appropriate signaling system. Possible signal generators include waveform generators or pitch generators. A digital PCM encoder and oscillator could also be used whereby the PCM encoder modulates the oscillator on and off with a selected digital code. The resultant pulsed radio frequency carrier is then transmitted to receiver 24 within console 18.

The receiver 24 may be a digital or analog receiver. Signal repeaters can be used to increase the range of the transmitter signal. Such repeaters may be wired or wireless. A wireless port could allow communication to console when the transmitter 12 is not in the same room as the console 18 so long as a power source is available. Receiver 24 in console 18 receives the emergency transmission initiated by the user 5. Receiver 24 converts the RF signal to a digital pulse stream and sends the signal to controller 30, which may be any type of computer processor. Next, controller 30 evaluates the signal and verifies the information. Specifically, controller 30 analyzes the transmitted signal and compares it with a set of pre-determined values to ascertain whether the transmission requires controller 30 to access a telephone line. Such pre-determined values are programmed into the controller 30 and may include signal duration and frequency. This evaluation step prevents controller 30 from retrieving a telephone line unless the incoming transmission duration and frequency match the pre-determined receiver settings. The controller 30 further determines whether the incoming transmission is an emergency signal or a non-emergency signal.

If the parameters of the incoming transmission signal match the pre-determined values, controller 30 will open a telephone circuit to access a telephone line. The telephone access is done via telephone interface connector 28, which connects console 18 to telephone line 22. Controller 30 then enables amplifiers, speakers and/or microphones and dials the pre-programmed telephone number for emergency situations, which would preferably be an emergency response center where operators have the capability to assess the nature of the emergency and dispatch emergency medical personnel.

An operator at the emergency response center 32 picks up the telephone, and the call is connected. Upon this initial connection, controller 30 opens the voice line for an initial pre-programmed time frame. This initial time frame is very limited, e.g., about 30 seconds but may be longer or shorter depending on the required system parameters. During this initial open voice line period, tone simulator 40 emits the first simultaneous two-tone combination. As discussed above, this first tone simulates a "1" tone that is recognized by console 18. When console 18 receives the "1" tone, the voice line is activated. Once DTMF decoder 208 acknowledges the "1" tone, and controller 30 verifies the tone, DTMF generator 209 begins sending specific pre-programmed account information to the call center via a series of DTMF tones. Once the DTMF information is processed by the emergency call center 32, the voice line stays open for a pre-programmed length of time, which may be between one minute and sixty minutes, or any period deemed sufficient to communicate the requisite emergency information for responding to an emergency. During this time the user 5 of the response system and the operator 33 at the emergency response center can converse over the telephone voice line. In particular, the voice communication is through the voice switched speaker phone circuit 212, the base station microphone 218, the amplifier 210 and the console speaker 217. In the absence of simulation of the "1" tone, the telephone call will be disconnected upon expiry of the initial 30-second time period.

During this active voice line period, the user 5 suffering from the medical emergency communicates to the operator 33 the details of the medical emergency. The operator 33 may inquire as to pertinent information relating to user 5, such as symptoms being experienced by the user and the user's medical history. The operator 33 then dispatches the appropriate emergency medical personnel to the address of the user 5 suffering the medical emergency. The operator 33 also may provide certain general advice to the user 5 as a stop-gap pending arrival of the emergency medical personnel.

When the operator 33 and the user 5 have stopped speaking, the voice line remains open as the operator 33 hangs up or otherwise manually disconnects the telephone. The disconnect command from the emergency response center 32 triggers tone simulator 40 to emit the second simultaneous two-tone combination. This second tone simulates a "9" tone from a telephone. The "9" tone signals to console that the telephone call is complete. Upon receiving the second two-tone combination, controller 30 disconnects the voice line to close the voice line and terminate the telephone call. Without this simulation of a "9" tone controller 30 will not close the voice line and terminate the telephone call.

Also with reference to FIGS. 1-6, the process will now be described with regard to a non-emergency medical situation. In this example, the user 5 may have a medical problem, but it is not a life-threatening emergency. The process begins when the user 5 presses non-emergency button 16 on transmitter 12. Non-emergency button 16 is shown here with a star or asterisk logo, but may have any design or no design at all, so long as it is differentiated from emergency button 14. When the non-emergency button 16 is pressed, non-emergency call center visual activation LED indicator 106 is activated and emits a blue light. Transmitter 12 sends a non-emergency signal to console 18, which tells the console to dial the pre-programmed emergency telephone number. Specifically, microcontroller 101 transmits an encoded RF transmission via the radio frequency transmitter 102.

The receiver 24 in console 18 receives the non-emergency transmission initiated by the user 5. Next, controller 30 analyzes the transmitted signal and compares it with a set of pre-determined values to verify the information and ascertain whether the transmission requires controller to access a telephone line. This evaluation step prevents controller 30 from retrieving a telephone line unless the incoming transmission duration and frequency match the pre-determined receiver settings. The controller further determines whether the incoming transmission is an emergency signal or a non-emergency signal.

If the parameters of the incoming transmission signal match the pre-determined values, controller 30 will open a telephone circuit and access a telephone line. The telephone access is done via telephone interface connector 28, which connects console 18 to telephone line 22. Controller 30 then dials the pre-programmed telephone number for non-emergency situations, which calls non-emergency medical response center 36. A non-emergency medical response center could be a medical or nurse triage call center, an urgent care facility, a doctor's office or doctor on-call number, any other health facility, or a the phone number of a family member or neighbor.

An individual or operator 37 at the non-emergency response center 36 picks up the telephone, and the call is connected. As with the process for the emergency situation described above, when the call is initially connected, controller 30 opens the voice line for an initial pre-programmed time frame of a limited duration. During this initial open voice line period, tone simulator 40 emits the first simultaneous two-tone combination simulating a "1" tone recognized by console 18. When console 18 receives the "1" tone, the voice line is activated. The DTMF decoder 208 acknowledges the "1" tone, and controller 30 verifies the tone. Then DTMF generator 209 optionally may begin to send specific pre-programmed account information to the call center via a series of DTMF tones. Once the DTMF information is processed by the non-emergency medical center 36, the voice line stays open for a pre-programmed length of time, during which the user 5 of the response system and the medical professional or operator 37 at the non-emergency response center 36 can converse over the telephone voice line. The pre-programmed length of time may be between one minute and sixty minutes, or any period deemed sufficient to communicate the requisite non-emergency information.

During this active voice line period, the user 5 suffering from the non-emergency medical condition communicates to the individual 37 the details of the medical condition. If the individual called is a family member or neighbor, that individual may go to the user's home to provide some care or aid in transporting the user to the doctor. If the individual is a nurse or other medical professional, the individual may inquire as to the symptoms being experienced by the user and the user's medical history. The individual 37 can then provide medical recommendations for the user 5, such as which and how much medication to take, foods to eat or avoid and danger signs to look for should the medical condition worsen.

As with the process for emergency situations described above, the voice line remains open after the user 5 and the called individual 37 stop speaking. When the individual or medical professional 37 hangs up or otherwise manually disconnects the telephone, the disconnect command from the telephony server 42 at the non-emergency response location 36 triggers tone simulator 40 to emit the second simultaneous two-tone combination. This second tone simulates a "9" tone from a telephone and signals to console 18 that the telephone call is complete. Upon receiving the second two-tone combination, console 18 disconnects the voice line to close the voice line and terminate the telephone call.

Figure 7:
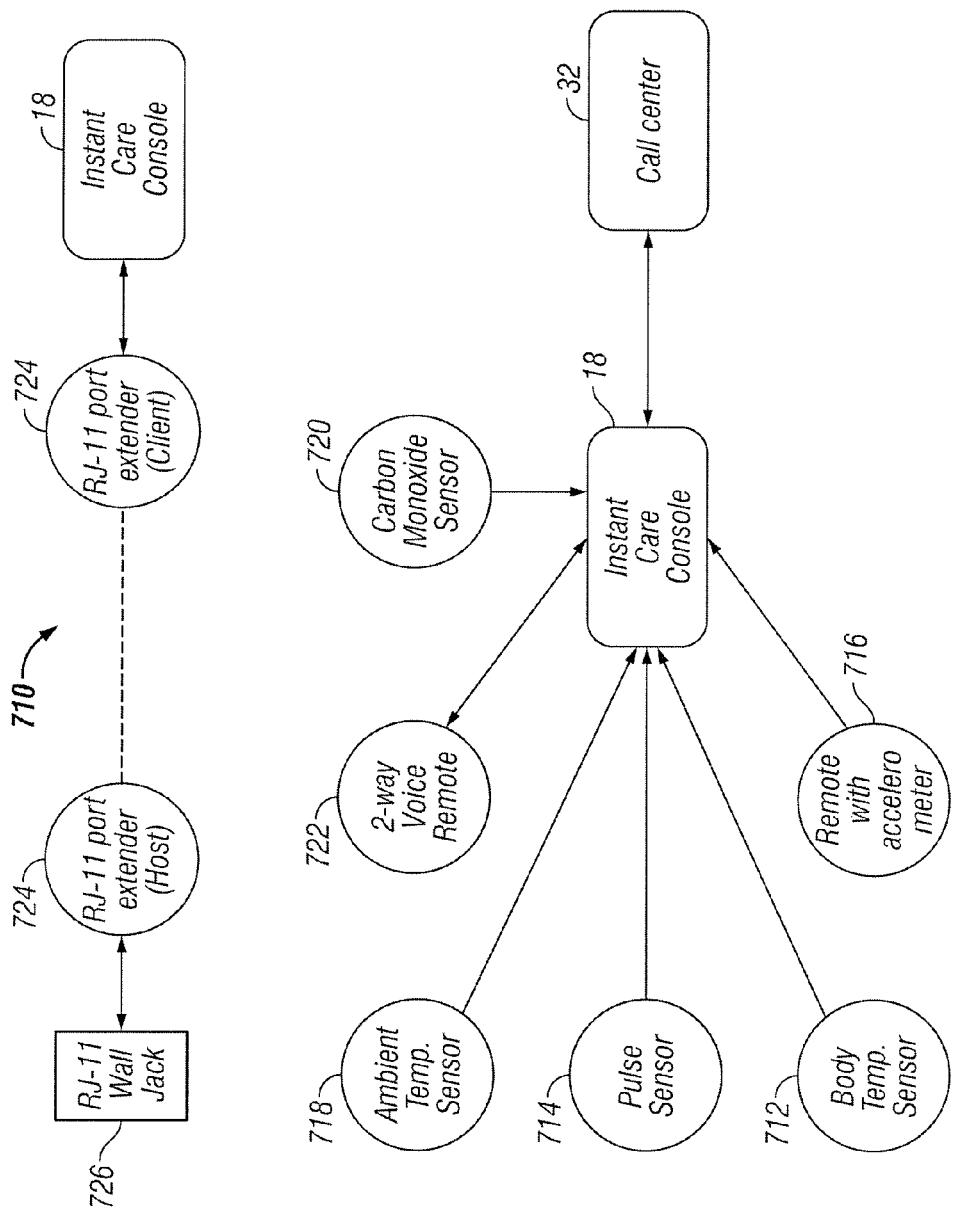
FIG. 7 is a flow diagram of an embodiment of a communication system in accordance the present invention.

Alternative embodiments of communication systems that detect the user's vital signs and ambient conditions that could impact the user's health will now be described with reference to FIGS. 7-8. Communication system 710 comprises console 18 and transmitter 12, each having essentially the same internal systems and components as described above with reference to the emergency and non-emergency response systems. Briefly, console 18 comprises a receiver 24 to receive a signal from the transmitter 12, a controller 30 to evaluate the received signal, access the communication network 22 and dial a voice line address and a communication interface 28 to connect the receiver 24 to a communication network. An audible communication device such as a speaker and/or microphone is operatively coupled to the controller 30 and the communication interface 28.

Communication system 710 further comprises one or more sensors 712, 714, 718, 720, 722 that can be situated on the user's person or in various locations throughout the home of the user. Such sensors can include one or more of the following sensors described herein. Each of these sensors can be included in console 18 or situated remotely and equipped to communicate to the console 18 via an RF or power line carrier.

Various sensors can be used to detect potentially hazardous conditions and vital signs of the user. A body temperature sensor 712 detects the user's body temperature. For elderly people or people in ill health, fluctuations in body temperature can pose serious health risks. Such a sensor would be located on the person of the user and send a signal to console 18 if the user's body temperature goes above or below a pre-determined temperature range. Similarly, a pulse sensor 714 detects potentially dangerous fluctuations in the user's pulse and sends a signal to console 18 should the user's pulse drop below a pre-set minimum value. A movement sensor 716 detects lack of movement in the user that could indicate a health emergency. The movement sensor 716, preferably containing an accelerometer, also could detect instances in which a user falls down. A 2-way voice remote 722 could also be used to facilitate conversation with the user at a distance from the console 18, and port extenders 724 could be plugged into wall jack 726 to provide extended range.

Embodiments also can detect ambient conditions that could present health risks to elderly, frail or otherwise vulnerable users. An ambient temperature sensor 718 detects heat waves or extreme cold temperatures that could injure or threaten the health or life of the user. Many elderly people who live alone are sensitive and vulnerable to extreme heat and cold. Ambient temperature sensor 718 sends a signal to console 18 if the ambient temperature goes above or below a pre-determined temperature range. A carbon monoxide sensor 720 detects dangerous levels of carbon monoxide in the user's home and sends a signal to console 18 should the level rise above a pre-determined safe parameter. A smoke sensor 722 detects smoke and sends a signal to console 18 so emergency telephone numbers can be dialed immediately.

Figure 8:
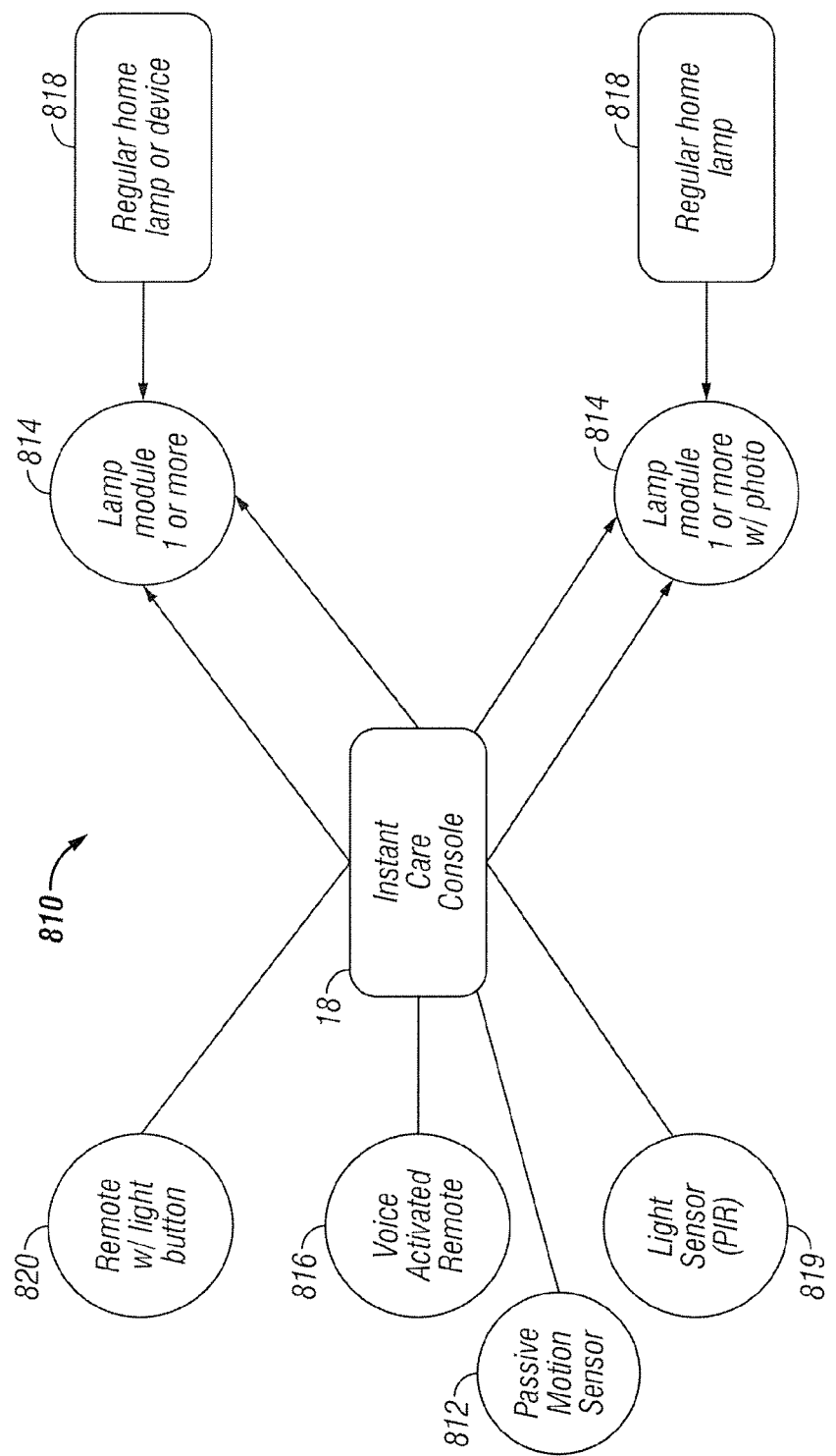
FIG. 8 is a flow diagram of an embodiment of a communication system in accordance the present invention.

Still further embodiments can provide other types of assistance to the user as is shown in FIG. 8 and described below. For example, communication system 810 may include a passive motion sensor 812, preferably using infra-red sensing technology, that can detect motion when the user is entering a dark room and trigger light fixtures in that room to turn on when the motion is detected. In this embodiment, the subject lighting fixtures would be operatively connected to a photocell receiver module 814. An associated voice remote device 816 could have a voice activated feature so the user can announce "lights on" or "lights off" and the voice remote device 816 will send a signal to console 18, which triggers any light fixtures 818 plugged into it to turn on. Similarly, console 18 could be programmed to turn on the lights when the user presses emergency button 14 on the transmitter 12. A light sensor 819 and/or remote with light button 820 could be used to turn on a light in advance of the user entering the room.

Figure 9:
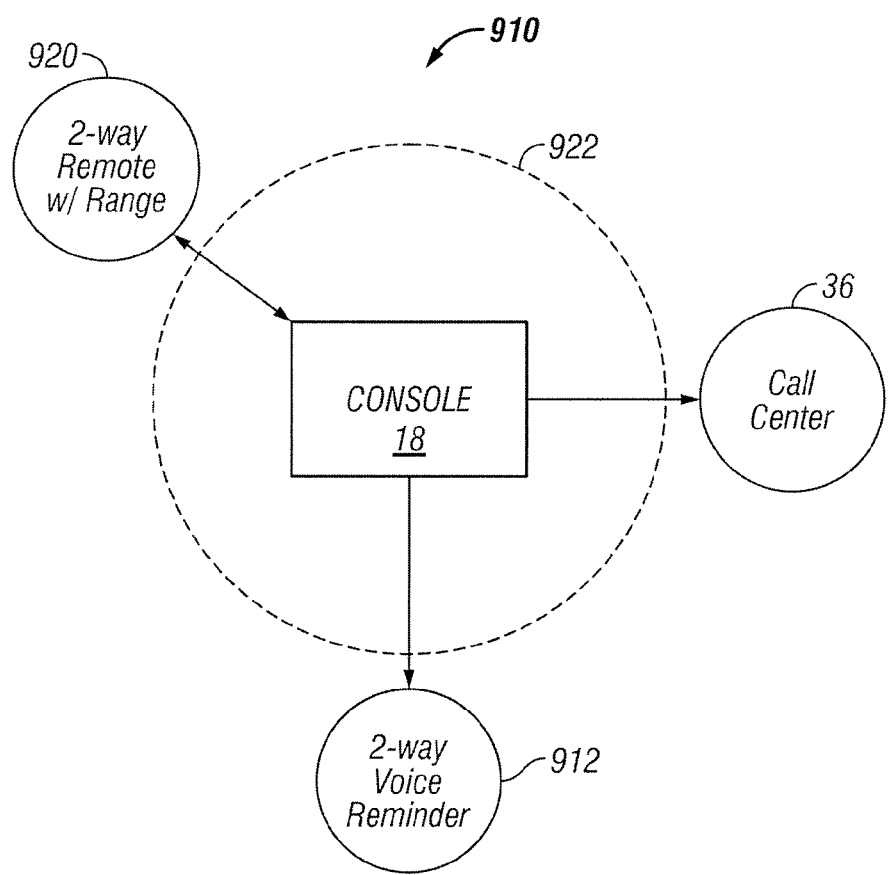
FIG. 9 is a flow diagram of an embodiment of a communication system in accordance the present invention.

Embodiments can remind users to take medication that may be critical to their health. As shown in FIG. 9, console 18 of emergency response system 910 can be pre-programmed to page transmitter 12 and play a pre-recorded message providing a voice reminder 912 through transmitter 12 stating that the user should take particular medication. Alternatively, a call center can call console 18 via telephone to trigger console 18 to page the transmitter 12 and play the reminder message. A 2-way remote with range 920 could emit a warning when the user moves out of range of the console signal.

While embodiments of the invention have been described above, it will be apparent to one skilled in the art that various changes and modifications may be made. It should be understood that any of the foregoing configurations and specialized components may be interchangeably used with any of the systems of the preceding embodiments. Although preferred illustrative embodiments of the present invention are described hereinabove, it will be evident to one skilled in the art that various changes and modifications may be made therein without departing from the invention. It is intended in the appended claims to cover all such changes and modifications that fall within the true spirit and scope of the invention.

What is claimed is:

1. A communication system comprising:
   a transmitter in operative communication with a console and operative to send a first signal to the console;
   the console operatively connected to a communication network and operative to send a second signal over the communication network to at least two different response systems, the console comprising:
   a receiver operative to receive the first signal from the transmitter, a controller operative to compare the first signal from the transmitter with a set of pre-determined values, access the communication network and dial one of at least two pre-programmed voice line addresses, each pre-programmed voice line address corresponding to one of the two different response systems; and a communication interface operative to connect the receiver to the communication network;

an audible communication device coupled to the controller and the communication interface; and a tone simulator that generates two tones, a first tone being generated upon connection of a voice line to one of the two different response systems and a second tone being generated to cause the termination of the voice line connection between a user of the communication system and an individual at one of the two different response systems;

wherein the system is configured to terminate the voice line connection between the console and the one of the two different response systems, when a predetermined tone is audible on a live connection between the console and the one of the two different response systems;

the first tone signaling to the console that the voice line communication has begun and the second tone signaling to the console that the voice line communication has ended.

2. The communication system of claim 1 wherein the tone simulator is located on a communication server at one or more of the response systems.

3. The communication system of claim 1 wherein the at least two response systems comprise an emergency response system and a non-emergency medical center.

4. The communication system of claim 1, wherein the first tone is a sinusoidal tone representing a 1 tone.

5. The communication system of claim 1, wherein the second tone is a sinusoidal tone representing a 9 tone.

6. The communication system of claim 1, wherein the console further comprises the tone simulator.

7. The communication system of claim 1, wherein the transmitter comprises two buttons, the first button operative to send the first signal to the console to dial a first pre-programmed voice line address to call an emergency response system when pressed, the second button operative to send the first signal to the console to dial a second pre-programmed voice line address to call a non-emergency medical center.

8. The communication system of claim 1 wherein the predetermined set of values comprises one or both of: a frequency value and a time value.

9. A communication system comprising:

a transmitter in operative communication with a console and operative to send a first signal to the console;

the console operatively connected to a communication network and operative to send a second signal over the communication network to at least two response systems, the console comprising:

a receiver operative to receive the first signal from the transmitter, a controller operative to compare the first signal from the transmitter with a set of pre-determined values, access the communication network and dial one of at least two pre-programmed voice line addresses, each pre-programmed voice line address corresponding to one of the two different response systems; and a communication interface operative to connect the receiver to the communication network; and a an audible communication device coupled to the controller and the communication interface;

wherein the system is configured to terminate a connection between the console and the one of the two different response systems, when a predetermined tone is audible on a voice line connection between the console and the one of the two different response systems.

10. The communication system of claim 9 further comprising a tone simulator that generates two tones, a first tone being generated upon connection of a voice line to one of the two different response systems and a second tone being generated upon termination of audible communication on the voice line between a user of the communication system and an individual at one two different response systems; wherein the first tone signals to the console the start of the voice line communication and the second tone signals to the console the end of the voice line communication.

11. The communication system of claim 10 wherein the first tone is a sinusoidal tone representing a 1 tone and the second tone is a sinusoidal tone representing a 9 tone.

12. The communication system of claim 9 wherein the two different response systems comprise an emergency response system and a non-emergency medical center.

13. The communication system of claim 12 wherein the non-emergency medical center is a medical triage call center.

14. The communication system of claim 9 wherein the transmitter comprises one or more buttons, each button being operative to send a signal to the console when pressed.

15. The communication system of claim 14 wherein the transmitter comprises two buttons, the first button operative to send the first signal to the console to dial a first pre-programmed voice line address to call an emergency response system when pressed, the second button operative to send the first signal to the console to dial a second pre-programmed voice line address to call a non-emergency medical center when pressed.

16. The communication system of claim 10 further comprising one or more sensors operative to send a signal to the console, the sensors comprising one or more of an ambient temperature sensor, a body temperature sensor, a pulse sensor, a motion sensor, a carbon monoxide sensor and a smoke sensor.

17. A method of communicating comprising:

transmitting a signal to a console;

receiving the signal;

comparing the signal with a set of pre-determined values;

accessing a communication network and dialing one of at least two pre-programmed voice line addresses based upon the received signal, each pre-programmed voice line address corresponding to one of two different response systems; and connecting to a communication network to provide audible communication over the communication network;

generating two tones, a first tone being generated upon connection of a voice line to one of the two different response systems and a second tone being generated to cause the termination of the voice line connection between a user of the communication system and an individual at one of the two different response systems, the first tone signaling to the console that the voice line communication has begun and the second tone signaling to the console that the voice line communication has ended;

wherein the system is configured to terminate a connection between the console and the one of the two different response systems, when a predetermined tone is audible on a voice line connection between the console and the one of the two different response systems.

18. The method of claim 17 wherein the two different response systems comprise an emergency response system and a non-emergency medical center.

19. The method of claim 17 wherein the first tone is a sinusoidal tone representing a 1 tone, and the second tone is a sinusoidal tone representing a 9 tone.

20. The method of claim 17, wherein the transmission step comprises pressing one of two buttons, the first button operative to send a signal to the console to dial a first pre-programmed voice line address to call an emergency response system when pressed, the second button operative to send a signal to the console to dial a second pre-programmed voice line address to call a non-emergency medical center when pressed.

* * * * *